(12) United States Patent
Durand et al.

(10) Patent No.: US 11,711,031 B2
(45) Date of Patent: Jul. 25, 2023

(54) PIEZOELECTRIC INERTIA ACTUATOR

(71) Applicant: MICRO-CONTROLE—SPECTRA-PHYSICS, Evry (FR)

(72) Inventors: Eric Durand, Amilly (FR); Joel Mendes Pereira, Saint-Jean-de-Braye (FR)

(73) Assignee: MICRO-CONTROLE—SPECTRA-PHYSICS, Evry (FR)

( * ) Notice: Subject to any disclaimer, the term of this patent is extended or adjusted under 35 U.S.C. 154(b) by 0 days.

(21) Appl. No.: 17/604,603

(22) PCT Filed: Apr. 15, 2020

(86) PCT No.: PCT/IB2020/053542
§ 371 (c)(1),
(2) Date: Oct. 18, 2021

(87) PCT Pub. No.: WO2020/217139
PCT Pub. Date: Oct. 29, 2020

(65) Prior Publication Data
US 2022/0200485 A1 Jun. 23, 2022

Related U.S. Application Data

(60) Provisional application No. 62/837,878, filed on Apr. 24, 2019.

(51) Int. Cl.
*H02N 2/02* (2006.01)
(52) U.S. Cl.
CPC .................................. *H02N 2/025* (2013.01)

(58) Field of Classification Search
CPC .................................................... H02N 2/025
See application file for complete search history.

(56) References Cited

U.S. PATENT DOCUMENTS

| 8,520,327 B2 | 8/2013 | Thomas et al. |
| 8,755,133 B2 | 6/2014 | Thomas et al. |
| 10,161,560 B2 | 12/2018 | Li |

(Continued)

FOREIGN PATENT DOCUMENTS

CN 108199612 A 6/2018

*Primary Examiner* — Emily P Pham
(74) *Attorney, Agent, or Firm* — Browdy and Neimark, PLLC

(57) ABSTRACT

A piezoelectric inertia actuator is disclosed herein, which includes an actuator body, a coupling body defining a receiver, a lock body positioned within the receiver, and a piezo body attached to the coupling body. At least one flexible frame configured to support an engaging body may extend from the piezo body. A spring blade configured to apply a preload force to the engaging body via a decoupling preload body may extend from the coupling body. A tension member may be positioned within the lock body and apply a preload force to the piezo body, thereby creating a net compressive stress therein. The piezoelectric inertia actuator may further include a piezo preload body configured to apply a reaction force to the piezo body in order to maintain the compressive stress therein. The preload applied to the piezo body may be substantially decoupled from the preload applied to the engaging body.

18 Claims, 5 Drawing Sheets

(56) References Cited

U.S. PATENT DOCUMENTS

| | | | |
|---|---|---|---|
| 10,250,164 B2* | 4/2019 | Hübner | ................ H02N 2/026 |
| 2015/0076965 A1 | 3/2015 | Culpi | |
| 2015/0295517 A1 | 10/2015 | Li | |
| 2018/0131292 A1* | 5/2018 | Hübner | ................ H02N 2/006 |
| 2019/0074778 A1 | 3/2019 | Marth et al. | |
| 2019/0229647 A1 | 7/2019 | Gao et al. | |

* cited by examiner

PIEZOELECTRIC INERTIA ACTUATOR

CROSS-REFERENCE TO RELATED APPLICATIONS

The present application claims priority to U.S. Provisional Patent Application Ser. No. 62/837,878—entitled "Piezoelectric Inertia Actuator and Method of Manufacture" filed on Apr. 24, 2019, the contents of which are incorporated by reference in its entirety herein.

BACKGROUND

Piezoelectric inertia actuators are used in a variety of motion control devices. They operate on the principle of stick-slip friction wherein a piezoelectric device expands or contracts based on an alternating electrical signal and this alternating change in size is transferred to a carriage or moving stage via a frictional contact with an engaging body, thereby resulting in a change in position of the carriage. Safe and reliable operation of a piezoelectric inertia actuator requires that the piezoelectric device be subject to a compressive stress or preload. Precise control of the position of the carriage requires precise control of the frictional interface between the carriage and the engaging body. Since friction is usually directly proportional to the normal load between surfaces, some biasing force or preload usually exists between the respective surfaces of the engaging body and the carriage. Precise control of this preload has proven difficult in the past. Additionally, the preload applied to the piezoelectric device may result in unwanted changes to the preload between the engaging body and the carriage.

As such, there is an ongoing need for an improved piezoelectric inertia actuator capable of precisely controlling and decoupling the various preloads.

SUMMARY

The present application discloses various embodiments of a piezoelectric inertia actuator and methods of manufacture.

In one embodiment, the present application discloses a piezoelectric inertia actuator which may include at least one actuator body, at least one coupling body defining a receiver, and a lock body configured to be positioned within the receiver. At least one piezo body may be bonded or otherwise attached to the coupling body. At least one flexible frame may extend from the piezo body, the flexible frame configured to support at least one engaging body in communication with the piezo body. At least one spring blade may extend from the coupling body, the spring blade configured to apply a preload biasing force to the flexible frame and the engaging body. The piezoelectric inertia actuator may further include at least one tension member positioned within a tension member receiver and configured to selectively apply a preload force to the piezo body, thereby creating a net compressive stress within the piezo body. The engaging body may be detachably or non-detachably coupled to the flexible frame. The piezoelectric inertia actuator may further include at least one piezo preload body in communication with at least one of the actuator body or the flexible frame, the piezo preload body being configured to apply a reaction force to the piezo body in order to maintain the net compressive stress within the piezo body. At least one decoupling preload body may be formed in communication with at least one of the spring blade, the flexible frame, and the engaging body, the decoupling preload body configured to adjustably apply a biasing force generated by the spring blade to the engaging body.

In another embodiment, the piezoelectric inertia actuator may include a first preload zone configured to apply a first preload to at least one piezo body in a first direction, the first preload zone including at least one actuator body, at least one lock body, at least one tension member positioned within the lock body, at least one coupling body, and at least one piezo preload body. The piezoelectric inertia actuator may further include a second preload zone configured to apply a second preload to at least one engaging member in a second direction, the second preload zone including at least one spring blade including a flex region and at least one decoupling preload body, wherein an adjustment of the first preload does not result in a substantial change of the second preload. In one embodiment, the first preload zone and the second preload zone are substantially mechanically decoupled. In another embodiment, the first preload zone and the second preload zone are not substantially mechanically decoupled.

Other features and advantages of the piezoelectric inertia actuator and method of manufacture as described herein will become more apparent from a consideration of the following detailed description in conjunction with the accompanying exemplary figures.

BRIEF DESCRIPTION OF THE DRAWINGS

Various embodiments of a piezoelectric inertia actuator and method of manufacture will be explained in more detail by way of the accompanying drawings, wherein.

DETAILED DESCRIPTION

Figure 1:
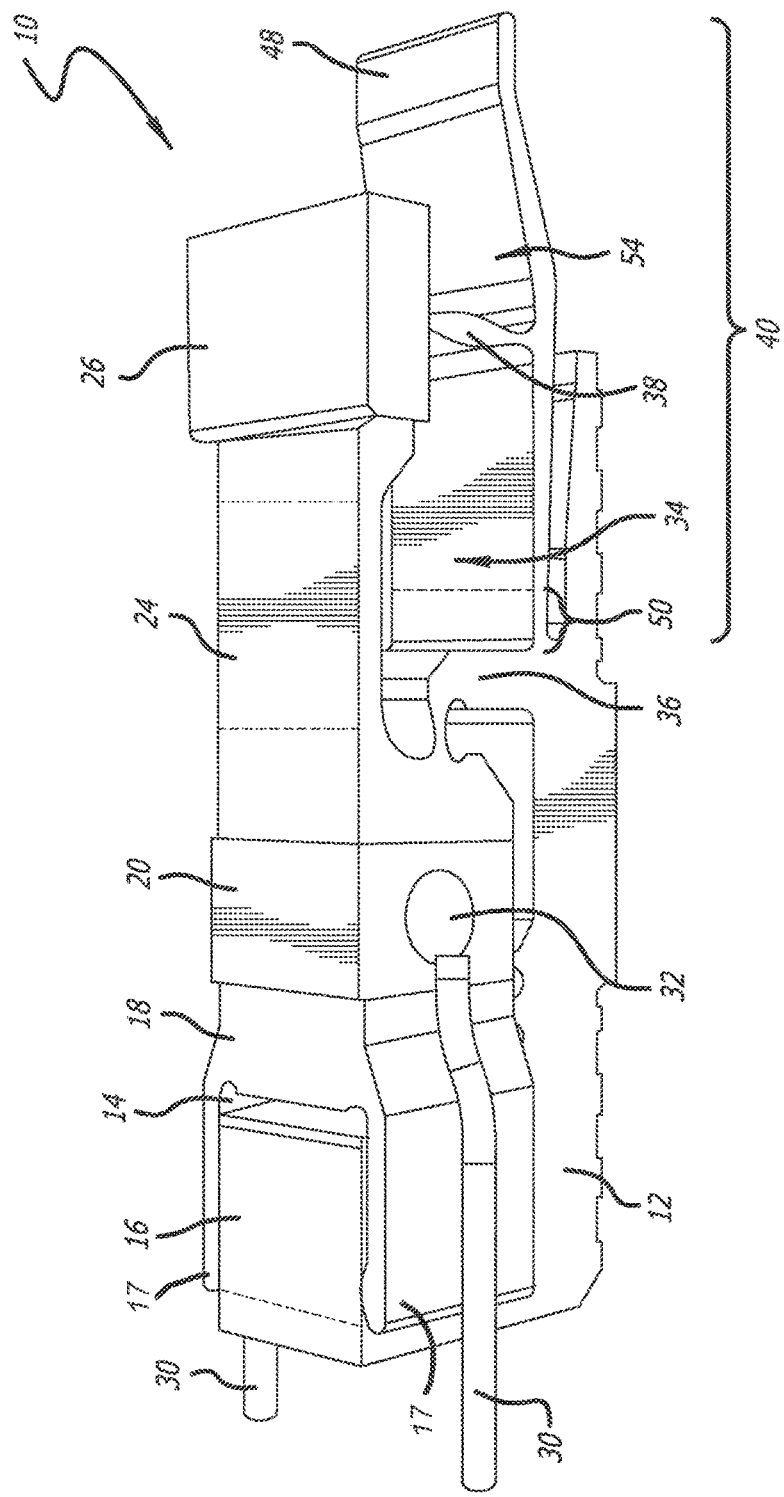
FIG. 1 shows an elevated perspective view of an embodiment of a piezoelectric inertia actuator.

The present application is directed to various embodiments of piezoelectric inertia actuators in the method of manufacture. The embodiments described herein may be directed to compact motorized driving mechanisms, such as piezoelectric inertia drivers, for use in precision positioning of optical components, optical mounts, kinematic optical mounts, rotary stages, linear stages, translation mounts, cartridges, and the like. Further, the piezoelectric inertia actuators described herein may be manufactured in any desired shape, size, or configuration.

FIGS. 1-5 show various views of an embodiment of a piezoelectric inertia actuator. As shown, the piezoelectric inertia actuator 10 includes at least one actuator body 12. In one embodiment, the actuator body 12 is manufactured from stainless steel. Optionally, the actuator body 12 may be manufactured from any variety of materials including, though limitations, aluminum, brass, copper, titanium, and/or various metals. Optionally, the actuator body 12 may be manufactured from one or more alloys. Exemplary alloys include, without limitations, copper tungsten, sintered powdered metals, nickel steel, nitinol, bronze, and the like. In another embodiment, the actuator body 12 may be manufactured from one or more polymers, composite materials, and the like. Further, the various components forming the piezoelectric inertia actuator may be manufactured using any variety of machining processes, additive manufacturing processes, 3D printing, and the like. In the illustrated embodiment, the actuator body 12 includes one or more base regions 60 configured to be mounted or secured to a frame or structure configured to support the piezoelectric inertia actuator 10. Optionally, the actuator body 12 need not include a base region 60.

The piezoelectric inertia actuator 10 may include at least one coupling body 18 located proximal to, in contact with, or attached to one or more piezo bodies 20. The piezo body 20 may include piezoelectric crystals, piezoelectric ceramics or any other suitable material that changes outer dimensions relative to the application of an external field or signal, such as an electrical signal—voltage or current. In one embodiment, at least one adhesive material configured to secure or bond the coupling body 18 to the piezo body 20 may be applied between the coupling body 18 and the piezo body 20. In another embodiment, the coupling body 18 may be secured to the piezo body 20 with one or more fasteners (not shown). In another embodiment, the coupling body 18 may be secured to the piezo body 20 by a preload force transmitted by the coupling body 18. Those skilled in the art will appreciate that any variety of materials, devices or methods may be used to secure the coupling body 18 to the piezo body 20.

As shown in FIG. 1, one or more extended regions 17 may be formed on the coupling body 18. In the illustrated embodiment, the coupling body 18 has two extended regions 17. Optionally, the coupling body 18 need not have extended regions 17. In one embodiment, the extended regions 17 are positioned in contact with opposing sides of at least one lock body 16 and are operative to retain or stabilize the coupling body 18 and the piezo body 20 laterally (i.e. in the Z-direction) with respect to the lock body 16. In another embodiment, the extended regions 17 may be used to dampen lateral vibrations of the lock body 16, the coupling body 18 and or the piezo body. Optionally, the extended regions 17 may not be in physical contact with the lock body 16. One or more receivers 14 may be formed in the coupling body 18 between the two extended regions 17. In one embodiment, the receiver 14 is configured to receive the lock body or member 16 therein. Like the actuator body 12, the lock body 16 may be manufactured from any variety of materials described above.

Figure 3:
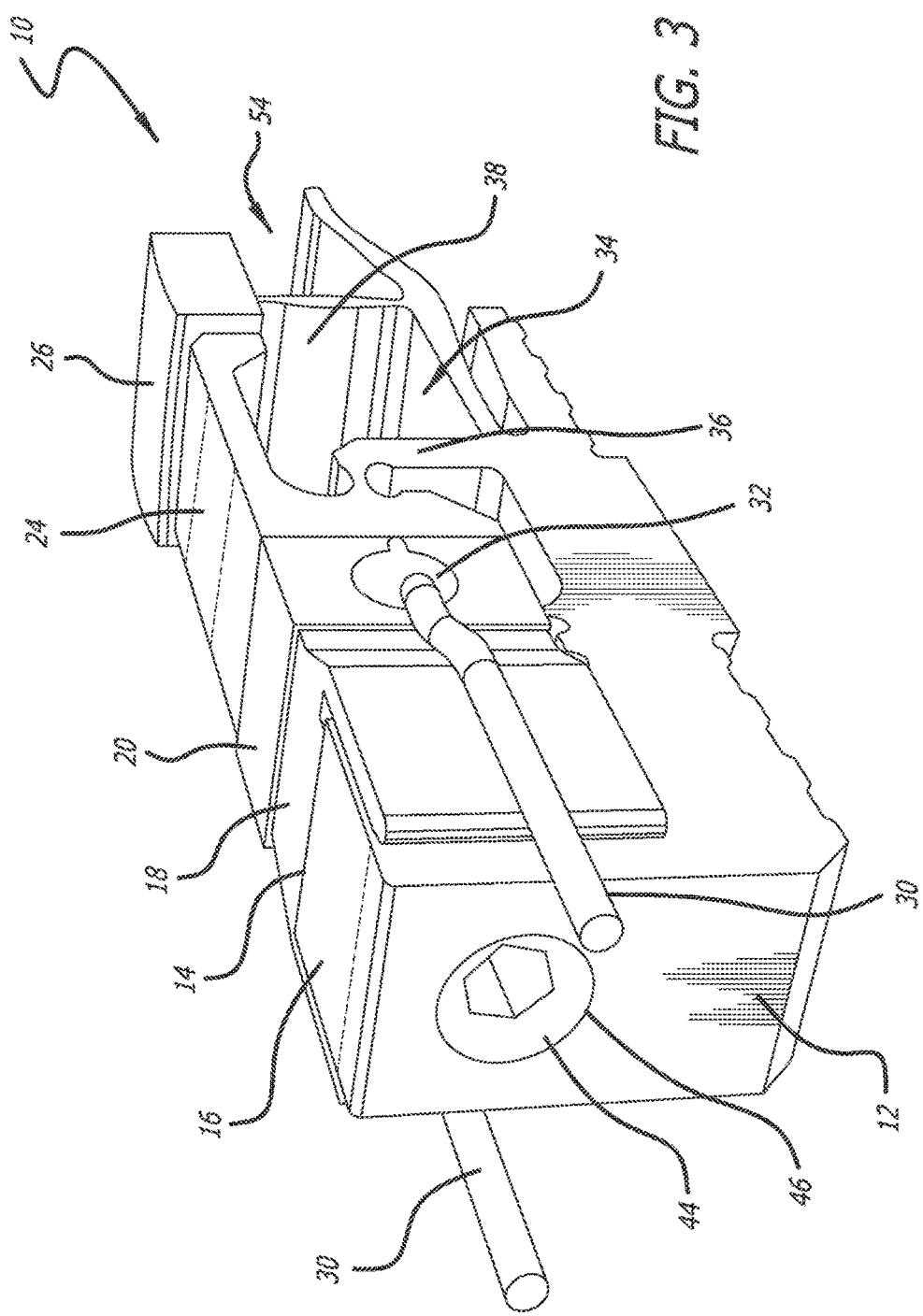
FIG. 3 shows an elevated perspective view of the embodiment of a piezoelectric inertia actuator shown in FIG. 1.
Figure 4:
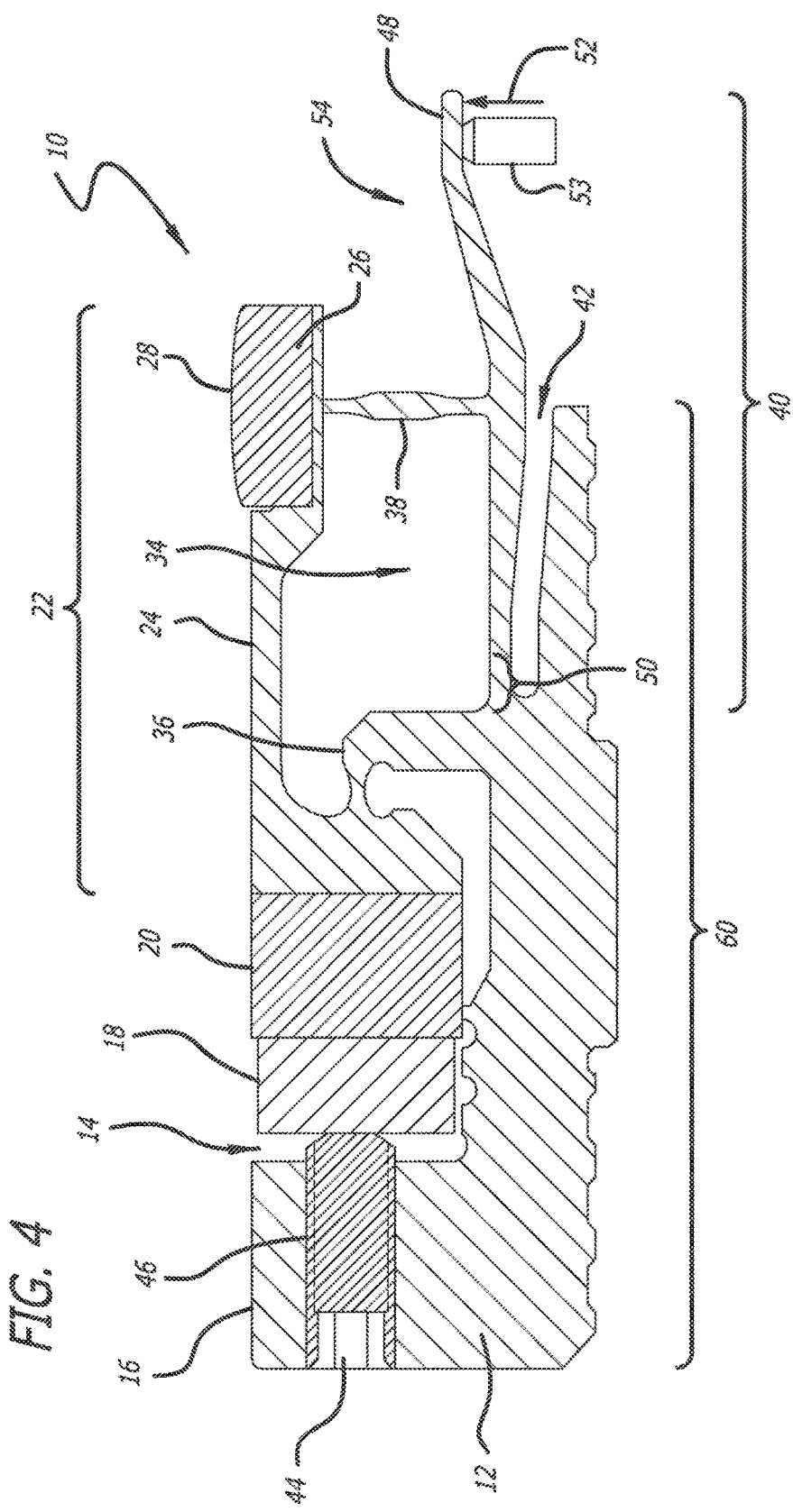
FIG. 4 shows a cross-sectional view of the embodiment of a piezoelectric inertia actuator shown in FIG. 1.
Figure 5:
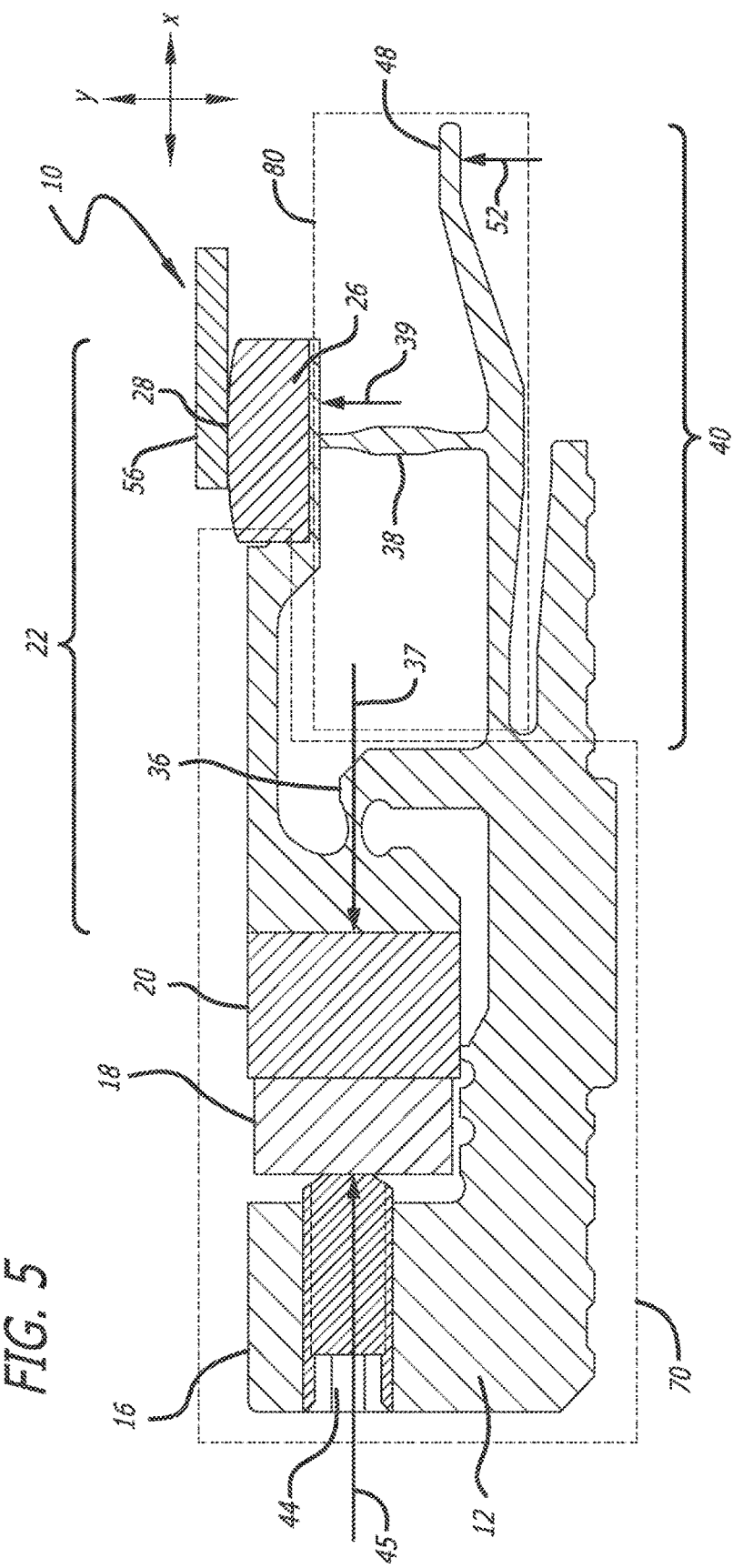
FIG. 5 shows a cross-sectional view of the embodiment of a piezoelectric inertia actuator shown in FIG. 1.

As shown in FIGS. 3-5, the lock body 16 may include one or more fasteners or tension members 44 positioned in one or more tension member receivers 46 formed in the lock body 16. In one embodiment, the tension member 44 may be used to secure the coupling body 18 to the piezo body 20. In another embodiment, the tension member may apply a preload or compression stress to the piezo body 20 in order to secure it within the piezoelectric inertia actuator 10, or to ensure proper and safe operation of the piezoelectric inertia actuator 10. In one embodiment, the user may vary the preload applied to at least a portion of the piezo body 20 by tightening or loosening the tension member 44 positioned within the tension member receiver 46. Optionally, the tension member 44 may traverse through the actuator body 12, the lock body 16, the receiver 14, and the coupling body 18 and may directly engage the piezo body 20, thereby securely coupling the piezo body 20 to the actuator body 12. As such, the actuator body 12, the lock body 16, receiver 14, and coupling body 18 may be configured to provide a rigid structure. The tension member 44 may be provided as a threaded member, a micrometer adjuster or linear actuator. Those skilled in the art will appreciate that any variety of adjusting devices may be used as the tension member 44.

Figure 2:
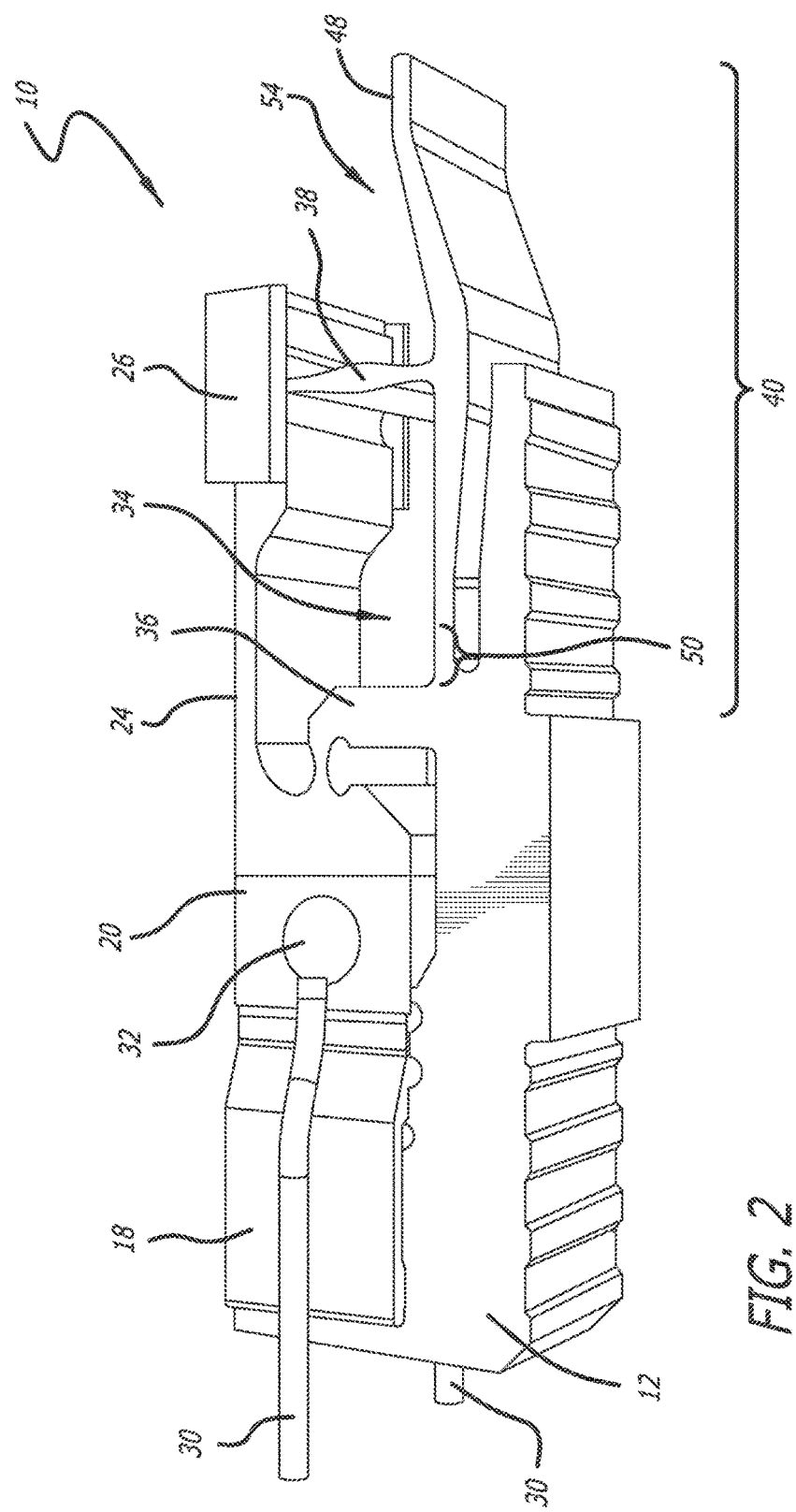
FIG. 2 shows an elevated perspective view of the embodiment of a piezoelectric inertia actuator shown in FIG. 1.

As shown in FIGS. 1 and 2, one or more conduits 30 may be coupled to the piezo body 20 and configured to selectively provide voltage and/or current to the piezo body 20. In the illustrated embodiment, the conduits 30 are coupled to the piezo body 20 via one or more conduit connectors 32. As such, the piezo body 20 may be in communication with at least one source of voltage and/or current via the conduits 30. In one embodiment, the conduit connectors 32 are solder bumps applied to opposite sides of the piezo body 20 configured to attach the conduits 30 to the piezo body 20. Optionally, the piezoelectric inertia actuator 10 shown in FIGS. 1-4 need not include conduit connectors 32.

Referring again to FIGS. 4 and 5, at least one flexible frame 22 may be coupled to and extend from the piezo body 20. The piezo body 20 may be secured to the flexible frame 22 with an adhesive material, fastener, or preload force such as those described above with respect to securing the piezo body 20 to the coupling body 18. As shown, the flexible frame 22 may include at least one flex region 24 formed thereon. Further, the flexible frame 22 may further include at least one engaging body 26 coupled to at least a portion of the flexible frame 22 and configured to contact and engage at least one carriage 56 at at least one contact point 28. In one embodiment, the flexible frame 22 and the various components thereof may be manufactured from any variety of materials. For example, in one embodiment the flexible frame 22 is manufactured from stainless steel. In another embodiment, the flexible frame 22 is manufactured from aluminum. Optionally, the flexible frame 22 may be manufactured from various metals including, without limitation, steel, copper, titanium, and/or various metals. Optionally, the flexible frame 22 may be manufactured from one or more alloys. Exemplary alloys include, without limitations, copper tungsten, sintered powdered metals, nickel steel, nitinol, brass, bronze, and the like. In another embodiment, the flexible frame 22 may be manufactured from one or more polymers, composite materials, and the like. Further, the flexible frame 22, flex region 24, and engaging body 26 may be manufactured from a single material. Optionally, the flexible frame 22, flex region 24, and engaging body 26 may be manufactured from different materials. In one embodiment, the engaging body 26 is detachably coupled to the flexible frame 22. In an alternate embodiment, the engaging body 26 may be non-detachably coupled to the flexible frame 22.

In one embodiment, the flexible frame 22 is configured to provide a rigid structure in the X-direction (see FIG. 5.), and provide a flexible structure in the Y-direction. The rigid structure in the X-direction is operative to transmit the alternating expansion and contraction of the piezo body 20 to the engaging body 26 in order to move the carriage 56 in the X-direction. The flexible structure in the Y-direction is configured to transmit a preload force to the engaging body 26 to allow for control of friction at the contact point 28 between the engaging body 26 and the carriage 56. In another embodiment, the flexible frame 22 may be configured to provide a flexible structure in the X-direction, and a rigid structure in the Y-direction. Those skilled in the art will appreciate that the flexible frame 22 may be configured to provide any level of stiffness or flexibility in either the X-direction or the Y-direction.

In the illustrated embodiment, the engaging body 26 has a radius formed thereon, with a single contact point 28. Optionally, the engaging body 26 may have any number of contact points 28. Alternatively, the engaging body 26 may have any geometry formed at the contact point. Those skilled in the art will appreciate that the engaging body 26 may be formed in any variety of shapes, geometries, sizes, surface finishes, and configurations. As described above, the engaging body 26 may be formed from a different material than the actuator body 12 and the flexible frame 24. As such, the properties of the material used in the engaging body 26 may be chosen to be compatible with the material of the carriage 56 (see FIG. 5). For example, if the material of the carriage 56 at the contact point 28 is a stainless steel, then the optimum material for the engaging body 26 may be silicon carbide with a relatively rough surface finish. Also, since the engaging body 26 may be detachably coupled to the flexible frame 24, the engaging body may be able to be replaced without replacement of the other components of the piezoelectric inertia actuator 10.

As shown in FIGS. 1-4, the actuator body 12 may include at least one recess 34 formed therein. In the illustrated embodiment, the recess 34 is formed proximate to the flex region 24 formed on the flexible frame 22 and/or the engaging body 26. Those skilled in the art will appreciate that the recess 34 may be formed anywhere on the actuator body 12 or the piezoelectric inertia actuator 10. Further, the piezoelectric inertia actuator 10 need not include a recess 34.

As shown in FIGS. 4 and 5, at least one spring blade, biasing blade or flexible member 40 may extend from the actuator body 12 and traverse at least a portion of the recess 34. In the illustrated embodiment, the spring blade 40 is used to apply or transmit a preload force 39 to the flexible frame 22 and/or the engaging body 26. As shown, the spring blade 40 may include at least one flex region 50 formed thereon, thereby permitting a user to vary the biasing force 39 applied by the spring blade 40. Optionally, the spring blade 40 need not include a flex region 50. At least one relief 42 may be formed between the base region 60 and the spring blade 40, the relief 42 configured to give the spring blade 40 sufficient flexibility to precisely control the preload of the engaging body 26 against the carriage 56. The spring blade 40 may also include at least one extended region 48 configured to be contacted by at least one adjusting member or device 53 configured to provide a preload force 52 to the spring body 40. Optionally, the spring blade 40 may not include an extended region 48. In one embodiment, the preload force 52 may be variable. In another embodiment, the preload force 52 may be fixed or pre-set during manufacture. In another embodiment, the preload force 52 may be actively adjustable during operation of the piezoelectric inertia actuator 10. In one embodiment, the adjusting device 53 is a threaded member such as a set screw. Optionally, the adjusting device 53 may be a micrometer adjuster or linear actuator. Those skilled in the art will appreciate that any variety of devices may be used as the adjusting device 53. At least one recess 54 may be formed in the actuator body 12 between the spring blade 40, the flexible frame 22 and engaging body 26, the recess 54 configured to allow deflection of the spring blade 40 and the extended region 48.

Referring again to FIGS. 1-5, the piezoelectric inertia actuator 10 may include at least one decoupling preload body 38. In the illustrated embodiment, the decoupling preload body 38 is formed integral to the spring blade 40 and extends from the spring blade 40 to the portion of the flexible frame 22 that supports or is coupled to the engaging body 26. Optionally, the decoupling preload body 38 need not be integral to the spring blade 40. In one embodiment, the biasing force 52 is exerted on the extended region 48 of the spring blade 40, thereby resulting in a preload force 39 being exerted on the flexible frame 22 and the engaging body 26 by the decoupling preload body 38. In one embodiment, the preload biasing force 39 applied by the decoupling preload body 38 to the engaging body 26 may be predetermined or preset. In an alternate embodiment, the preload biasing force 39 applied by the decoupling preload body 38 may be adjustable by the user. Because the preload can be maintained by the elastic deflection of the spring blade 40, the preload on the engaging body 26 may be less affected by geometric surface defects (wear, flat points, bumps, etc.) in the carriage 56. As such, unlike prior art piezoelectric inertia actuators, the preload biasing force 39 applied to the engaging body 26 may be adjusted by varying the position of the spring blade 40.

At least one piezo preload body 36 may be coupled to at least one of the actuator body 12, the flexible frame 22 and the spring blade 40. In one embodiment, the piezo preload body 36 may be configured to apply a pre-determined biasing force to the flexible frame 22 and/or the spring blade 40. In another embodiment, the piezo preload body 36 may be configured to deflect elastically, thereby maintaining the preload stress in the piezo body 20 that is exerted by the tension member 44, resulting in a reaction force 37 exerted on the piezo body 20 by the piezo preload body 36. Further, a user may vary the preload on the piezo body 20 by actuating both the tension member 44 positioned on the actuator body 12 and varying the biasing force 39 applied by the piezo preload body 36. In one embodiment, the piezo preload body 36 may be integral to the actuator body 12. As such, the piezo preload body 36 may be manufactured from the same material as at least a portion of the actuator body 12. In another embodiment, the piezo preload body 36 may be manufactured from a different material than the actuator body 12.

FIG. 5 shows a cross-sectional view of the piezoelectric inertia actuator 10. As described above, piezoelectric devices (such as the piezo body 20) require a compressive preload to ensure safe and reliable function. Also, the friction between the engaging body 26 and the carriage 56 at the contact point 28 should be controlled in order to allow predictable and precise control of the position of the carriage 56. Ideally, changes in the preload of the piezo body 20 should not result in a change in the preload at the contact point 28.

As shown in FIG. 5, in the illustrated embodiment, a first preload zone 70 and a second preload zone 80 are defined in the piezoelectric inertia actuator 10. Within the first preload zone 70, a preload force 45 on the piezo body 20 in the X-direction may be applied and adjusted by actuation of the tension member 44 within the lock body 16. Because, in the illustrated embodiment, the lock body 16 and the piezo preload body 36 are integral to and extend from the actuator body 12, the preload force 45 results in a reaction force 37 in the opposite X-direction due to the deflection of the piezo preload body 36 relative to the lock body 16, thereby maintaining a compressive stress in the piezo body 20. In one embodiment, the deflection of the piezo preload body 36 is elastic. In another embodiment, the deflection of the piezo preload body 36 results in plastic deformation of the piezo preload body 36. Because the piezo preload body 36 branches from the actuator body 12 at a point in the X-direction before the spring blade 40 extends from the actuator body 12, a deflection in the piezo preload body 36 will result in a minimal deflection of the spring blade. As such, the preload on the piezo body 20 in the X-direction may be substantially decoupled from the preload on the contact point 28 in the Y-direction.

As shown in FIGS. 4 and 5, within the second preload zone 80, a preload force 52 exerted on the extended portion 48 of the spring blade 40 by the adjusting device 53, results in a preload force 39 in the Y-direction being transmitted to the engaging body 26, thereby providing a preload between the engaging body 26 and the carriage 56 at the contact point 28. Because, as described above, the spring blade 40 (including the flex region 50) and the flexible frame 22 are relatively flexible in the Y-direction, a change in the amount of preload at the contact point 28 may result in only a very small change in the preload on the piezo body 20. As such, the preload on the contact point 28 in the Y-direction may be substantially decoupled from the preload on the piezo body 20 in the X-direction. Those skilled in the art will appreciate that the preloads in the first preload zone and the second preload zone may not be completely decoupled from the other. The design geometry of the piezoelectric inertia actuator 10 may be tailored so that the preloads in the first preload zone and the second preload zone do affect each other in a way defined by design choice. Also those skilled in the art will appreciate that there may be any number of preload zones defined in the piezoelectric inertia actuator 10.

The present application describes various embodiments of piezoelectric inertia actuators. While particular embodiments have been illustrated and described herein, it will be apparent that modifications to the design may be made without departing from the spirit and scope of the embodiments of the invention. As such, it is appreciated by persons skilled in the art that the present invention is not limited by what has been particularly shown and described above herein. Rather, the scope of the present invention includes both combinations and sub-combinations of various features described hereinabove as well as variations and modifications thereto which would occur to a person of skill in the art upon reading the above description and which are not in the prior art.

What is claimed:

1. A piezoelectric inertia actuator, comprising:
   at least one actuator body;
   at least one coupling body defining a receiver;
   at least one lock body configured to be positioned within the receiver formed in the at least one coupling body;
   at least one piezo body coupled to the at least one coupling body;
   at least one flexible frame coupled to and extending from the at least one piezo body;
   at least one engaging body in communication with the at least one piezo body via the at least one flexible frame; and
   at least one spring blade extending from the at least one actuator body, the at least one spring blade configured to selectively apply a pre-load biasing force to at least one of the at least one flexible frame and the engaging body.

2. The piezoelectric inertia actuator of claim 1, wherein the at least one actuator body and at least one lock body form a monolithic structure.

3. The piezoelectric inertia actuator of claim 1, further comprising at least one tension member receiver formed in the at least one lock body.

4. The piezoelectric inertia actuator of claim 3, further comprising at least one tension member positioned within the at least one tension member receiver and configured to selectively engage the at least one coupling body and the at least one piezo body to apply a preload force to the at least one piezo body, the preload force configured to result in a net compressive stress within the at least one piezo body.

5. The piezoelectric inertia actuator of claim 1, wherein the at least one actuator body, the at least one lock body, a tension member, the at least one coupling body and the at least one piezo body form a rigid structure.

6. The piezoelectric inertia actuator of claim 1, further comprising at least one conduit coupled to the at least one piezo body and in communication with at least one source of voltage or current.

7. The piezoelectric inertia actuator of claim 1, wherein the at least one flexible frame further comprises at least one flex region.

8. The piezoelectric inertia actuator of claim 1, wherein the at least one engaging body is detachably coupled to the at least one flexible frame.

9. The piezoelectric inertia actuator of claim 1, wherein the at least one engaging body is non-detachably coupled to the at least one flexible frame.

10. The piezoelectric inertia actuator of claim 4, further comprising at least one piezo preload body in communication with at least one of the at least one actuator body or the at least one flexible frame, the at least one piezo preload body configured to apply a reaction force to the at least one piezo body to maintain the net compressive stress within the at least one piezo body.

11. The piezoelectric inertia actuator of claim 1, further comprising at least one decoupling preload body in communication with at least one of the at least one spring blade, the at least one flexible frame and the at least one engaging body, the at least one decoupling preload body configured to adjustably apply a biasing force generated by the at least one spring blade to the at least one engaging body.

12. The piezoelectric inertia actuator of claim 11, wherein a change in a preload force to the at least one piezo body does not result in a substantial change in the biasing force applied to the at least one engaging body by the at least one decoupling preload body.

13. A piezoelectric inertia actuator, comprising:
    an actuator body;
    at least one lock body formed on the actuator body;
    at least one tension member receiver formed in the at least one lock body and configured to accept at least one tension member, the at least one tension member configured to apply a preload force to at least one coupling body;
    at least one piezo body coupled to the at least one coupling body;
    at least one flexible frame coupled to and extending from the at least one piezo body;
    at least one engaging body in communication with the at least one piezo body via the at least one flexible frame; and
    at least one spring blade extending from the actuator body, the at least one spring blade configured to selectively apply a preload biasing force to at least one of the at least one flexible frame and the at least one engaging body via at least one decoupling preload body.

14. The piezoelectric inertia actuator of claim 13, further comprising at least one piezo preload body formed on the actuator body and in communication with the at least one flexible frame and the at least one piezo body.

15. The piezoelectric inertia actuator of claim 14, wherein the at least one piezo preload body is configured to apply a reaction force to the at least one piezo body.

16. The piezoelectric inertia actuator of claim 15, further comprising:
    a first preload zone, configured to apply a first preload to the at least one piezo body in a first direction, the first preload zone including the actuator body, the at least one lock body, the at least one tension member, the at least one coupling body, the at least one flexible frame and the at least one piezo preload body;

a second preload zone, configured to apply a second preload to the at least one engaging body in a second direction, the second preload zone including the at least one spring blade, the at least one flex region and the at least one decoupling preload body; and wherein an adjustment of the first preload does not result in a substantial change of the second preload.

17. The piezoelectric inertia actuator of claim 16, wherein the first preload zone and the second preload zone are substantially mechanically decoupled.

18. The piezoelectric inertia actuator of claim 16, wherein the first preload zone and the second preload zone are not substantially mechanically decoupled.

\* \* \* \* \*